July 1, 1930. P. P. HARING 1,768,837
COTTON CLEANING APPARATUS
Original Filed Oct. 5, 1927
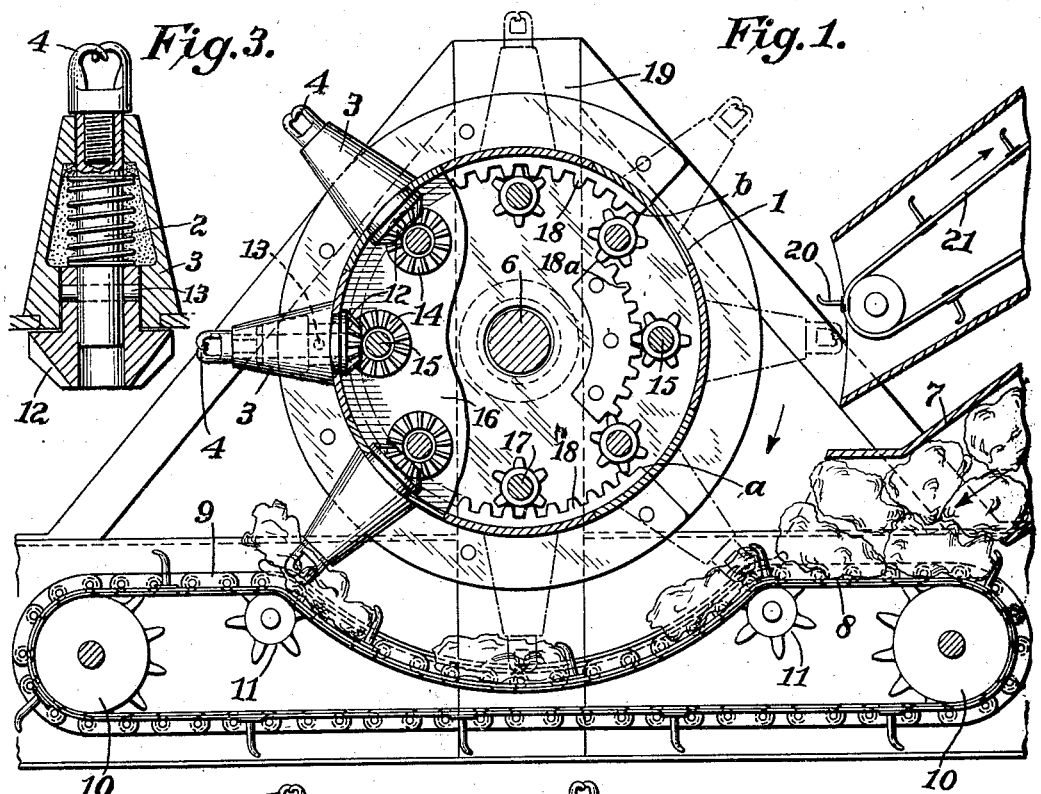
Inventor:
Peter Paul Haring,
by Spear, Middleton, Donaldson & Hall
Attys.

__Patented July 1, 1930__

1,768,837

UNITED STATES PATENT OFFICE

PETER PAUL HARING, OF DALLAS, TEXAS

COTTON-CLEANING APPARATUS

Application filed October 5, 1927, Serial No. 224,132. Renewed September 24, 1929.

The invention involves the process of and apparatus for the cleaning of seed or lint cotton by subdividing the layer of supply or cotton into portions and subjecting said portions to rapid rotary or twirling motion whereby foreign matter will be more or less exposed, due to the subdivision of the supply of seed or lint cotton into more or less separated portions or locks, and then this foreign matter will be dislodged and thrown off from the cotton by centrifugal force, due to the rapid rotary movement to which the portions are subjected.

The invention is intended to clean the cotton either in the field as soon as it is picked or at any station to which the cotton may be transported and at which the cleaning apparatus is located.

In the accompanying drawing:

Figure 1 is an elevation partly in section of an apparatus embodying my invention.

Fig. 2 is a sectional view taken longitudinally of the carrier for the implements which grasp the cotton, separate it into portions and twirl these portions for freeing them from the foreign matter.

Fig. 3 is a detail view of one of the implements for separating and twirling the locks of cotton and its mounting.

In the drawings 1 is a rotary drum or carrier moving in the arrow direction having spindles or arms 2 journalled in conical members 3 fixed to the carrier, the said arms having fingers 4 curved to engage and take on a portion of the cotton when rotated in one direction and to free themselves from the portion of cotton when rotated in the opposite direction. The carrier is rotated by any suitable means such as a belt and drive pulley 5 mounted on the shaft 6 of the carrier. The arms or spindles 2 extend radially and when the drum is rotated they move along a curved path into which path the supply of uncleaned cotton is delivered by any suitable means such as a chute 7, and a conveyor 8. This conveyor is in the form of an endless belt connected to endless chains 9 passing around sprocket wheels 10 and over idler rolls 11 so that the stretch of belt opposite or directly below the rotary carrier will move along a curved path concentric with the path of movement of the implements i. e. the fingers 4 which are intended to grasp the cotton, separate the supply into portions and rotate these portions at suitable speed to throw off the foreign matter. The spindles 2 with the pronged implements or fingers 4 besides having the travelling movement due to the rotation of their carrier 6 also have rotary movement about their own axes. This rotary movement is caused by the bevel gears 12, fixed to the spindles by pins 13, engaging bevel gears 14 on shafts 15 mounted in the heads 16 of the drum or carrier. These shafts are rotated as the drum is rotated by gears 17 on the shafts meshing with the fixed segmental rack 18. This rack is fixed to the main or fixed frame 19 which also furnishes the support for the shaft of the drum or carrier. The fixed rack 18 has its teeth facing inwardly and the direction of rotation of the implements or cotton engaging fingers due to the gears 17 engaging and travelling along the fixed rack 18 is such that said fingers will enter the supply of raw cotton as fed by the conveyor and will divide it up into substantially separate portions and will twirl or rotate these portions so long as the gear 17 continues to travel along the rack 18. By subdividing the supply of cotton into separate portions or in other words, by taking separate portions from the conveyor 8 any foreign matter will be exposed and in the subsequent rotation of the individual portions any foreign matter which remains with the portion taken up will be thrown off by centrifugal force due to the rotation of this portion.

Some foreign matter will remain on the conveyor and will be discharged over the left hand end of the same where it turns about the left hand sprocket wheel.

It will be noticed that the rack 18 is of considerable length reaching from a point $a$ about 270° about the axis of the carrier to the point $b$ and during the time implement holding the bunch of cotton is traversing a path of a like number of degrees viz 270 the said portion is subjected to the twirling action which has the effect of throwing off the foreign matter.

When the point $b$ is reached the gear 17 leaves the rack 18 and then meshes with another and shorter rack segment $18^a$ which has its teeth facing outwardly and being in the path of the inner side of the gear 17 it will rotate this gear in a reverse direction in respect to its rotation above referred to with the result that the curved fingers 4 of the cotton grasping and rotating implements will withdraw themselves from the bunch of cotton which up to now has been carried by said fingers with the result that the cotton bunch cleared of its foreign matter will fall and be taken by pins 20 of a discharge conveyer 21 which will deliver the cotton to any desired point. This segmental rack $18^a$ like the rack 18 is mounted on the fixed frame part 19. It will be noted from Fig. 2 that the cotton grasping and twirling implements are arranged at different points along the drum as well as around the drum. Each shaft 15 drives a plurality of implements, say four in each longitudinal row. The gears 14 on this shaft may be so disposed that the fingers of one implement will rotate in one direction to grasp and hold its bunch or portion of cotton while the fingers of the next implement may be rotated in the opposite direction, or all the fingers may be rotated in the same direction. In either case each implement will deal with its own portion of the main supply fed to the machine twirling it and separating it from the portion or bunch grasped by the other implement or implements.

It will be understood that I do not limit myself to a drum form of carrier and that the disclosure herein made is for the purpose of illustrating one form of my invention and is not to be regarded as a limitation upon its scope for which reference is made to the appended claims.

It will be observed that with the organization herein disclosed a supply of cotton of considerable width may be fed to the cleaning implements. The fingers are at the outer ends of the arms and as a series they overlie the layer of cotton from edge to edge of the same.

The organization above described can be located in such position that the cleaned cotton can be discharged into a wagon.

While I have described my apparatus as adapted to be placed in the field or at any suitable location to which the cotton after being picked from the plant, is transported, it will be understood that the apparatus may be associated with a cotton picking apparatus to travel therewith and receive the cotton from the picking mechanism.

The implements are spaced apart sufficiently that the centrifugal action resulting from the twirling of the subdivided portions can be effective at each bunch without interference by any adjacent bunch.

In other words, each bunch or lock being at the terminal of the implement and separated from the adjacent bunches will throw off its foreign matter without interference with the other bunches or without interference by them upon its own action.

In the operation of the apparatus the implements will deal largely with individual locks of the cotton. The action of the conveyor which transports the cotton to the rotary fingers or implements will divide the supply into locks and these locks will be taken up by the implements and subjected to the rotary motion.

The drawing is to be regarded as of diagrammatic character. The capacity of the drum with its rotating implements is so calculated in relation to the feeding capacity of the conveyor that all the cotton supplied by the conveyor will be subjected to the twirling action of the implements.

I claim:

1. The apparatus substantially as herein described for cleaning cotton, comprising means for feeding the cotton substantially in a layer, and rotating means for seizing successive portions of the supply of cotton and subjecting them individually to a twirling motion about individual axes one passing through each of said portions to throw off foreign matter by centrifugal force, substantially as described.

2. A cotton cleaning apparatus, comprising a conveyor for feeding cotton, rotary means for taking successive portions of the cotton from said conveyor and subjecting the same individually to a twirling action about individual axes one passing through each of said portions to throw off foreign matter by centrifugal force, and means whereby the cotton is automatically cleared or discharged from said rotary means after being subjected to said twirling action, substantially as described.

3. A cotton cleaning machine, comprising a carrier member mounted in stationary bearings and having a plurality of rotating members thereon provided with fingers to engage the cotton, said members succeeding each other in their action upon the cotton and taking and twirling the same to throw off foreign matter by centrifugal force, means for rotating the said members first in one direction to seize and twirl the successive portions of the cotton, and then in the other direction to discharge the cotton, and means for feeding a supply of cotton to the said carrier member, substantially as described.

4. In combination in a cotton cleaning machine, a conveyor for feeding the cotton substantially in a layer, means for taking the cotton from said conveyor, twirling it in separate portions about separate axes to throw off foreign matter and then releasing the cotton at a delivery point, and a conveyor for receiving the cleaned cotton, substantially as described.

5. In combination in a cotton cleaning apparatus, a carrier having projecting rotating arms rotatably mounted in said carrier with fingers at the outer ends of said arms, means for directing a mass of raw cotton into the pathway of said arms, and means for operating the carrier and rotating said arms in said carrier during their travelling movement.

6. In cotton cleaning apparatus the combination of a conveyor for feeding locks of cotton, means for picking up and rotating the locks of cotton substantially individually to throw off foreign matter and means for reversing said rotating means to release the locks of cotton, after being cleaned for their discharge, substantially as described.

7. The hereindescribed method of cleaning cotton consisting in dividing portions from the supply, individually twirling the body of each of said separated portions whereby foreign matter will be thrown off by centrifugal force, and then delivering it at a point for storage or further treatment.

8. The hereindescribed method of cleaning cotton, consisting in dividing portions from the supply, twirling each of said separated portions bodily about individual axes one passing through each of said separated portions, to throw off foreign matter by centrifugal force, and then delivering it at a point for storage or further treatment.

9. In combination in a cotton cleaning apparatus, a rotary carrier having projecting arms rotatably mounted on said carrier on individual axes, means for directing a mass of raw cotton into the pathway of the arms, and means for rotating the carrier and for rotating the arms in the carrier to successively seize and twirl individual portions of the mass of cotton.

10. A cotton cleaning apparatus consisting of means for feeding a mass of picked locks of cotton, a plurality of devices, each rotating in one direction about an axis individual thereto, each of said devices picking up an individual portion of said mass and conveying and twirling said portion about the axis individual to said device, means carrying said devices whereby they are given a travelling movement while being rotated about their individual axes, and means for reversing the rotary movement of said devices to clear themselves of the locks of cotton, substantially as described.

In testimony whereof, I affix my signature.

PETER PAUL HARING.